US012454302B2

(12) United States Patent
Kim

(10) Patent No.: US 12,454,302 B2
(45) Date of Patent: Oct. 28, 2025

(54) VEHICLE STEERING COLUMN

(71) Applicant: HL MANDO CORPORATION, Pyeongtaek-si (KR)

(72) Inventor: Jeongrae Kim, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 18/378,443

(22) Filed: Oct. 10, 2023

(65) Prior Publication Data

US 2024/0336294 A1 Oct. 10, 2024

(30) Foreign Application Priority Data

Apr. 4, 2023 (KR) ........................ 10-2023-0043916

(51) Int. Cl.
*B62D 1/185* (2006.01)
*B62D 1/181* (2006.01)
*B62D 1/183* (2006.01)

(52) U.S. Cl.
CPC ............. *B62D 1/185* (2013.01); *B62D 1/181* (2013.01); *B62D 1/183* (2013.01)

(58) Field of Classification Search
CPC ........ B62D 1/181; B62D 1/183; B62D 1/185; B62D 1/187; F16C 29/041
See application file for complete search history.

(56) References Cited

U.S. PATENT DOCUMENTS

| | | | | |
|---|---|---|---|---|
| 2,672,378 | A * | 3/1954 | McVey | F16C 29/005 384/49 |
| 4,691,587 | A * | 9/1987 | Farrand | B62D 1/181 280/775 |
| 5,035,446 | A * | 7/1991 | Arvidsson | B62D 1/181 280/775 |
| RE34,359 | E * | 8/1993 | Matsumoto | B62D 1/181 74/495 |
| 5,477,744 | A * | 12/1995 | Hoblingre | B62D 1/192 74/89.17 |
| 6,079,743 | A * | 6/2000 | Grams | B62D 1/181 280/775 |
| 6,711,965 | B2 * | 3/2004 | Tomaru | B62D 1/181 318/470 |
| 7,617,866 | B2 * | 11/2009 | Pietras | E21B 19/16 166/77.51 |
| 7,631,898 | B2 * | 12/2009 | Bechtel | B62D 1/184 280/775 |
| 8,161,839 | B2 * | 4/2012 | Warashina | B62D 1/181 74/493 |
| 8,650,983 | B2 * | 2/2014 | Mizuno | B62D 1/181 74/496 |
| 8,910,976 | B2 * | 12/2014 | Toyoda | B62D 1/181 280/775 |
| 8,991,861 | B1 * | 3/2015 | Iwakawa | B62D 1/181 74/495 |
| 9,038,495 | B2 * | 5/2015 | Morinaga | B62D 1/181 74/493 |

(Continued)

*Primary Examiner* — Timothy Wilhelm
(74) *Attorney, Agent, or Firm* — Hauptman Ham, LLP

(57) ABSTRACT

The present embodiments provides a vehicle steering column that may more quickly and stably perform telescoping for adjusting the axial length of the steering column and stowing for drawing the steering wheel into or out of the dashboard, secure a convenient space for the driver, and provide safety and convenience to the driver.

9 Claims, 9 Drawing Sheets

(56) References Cited

U.S. PATENT DOCUMENTS 9,260,130 B2 * 2/2016 Mizuno .................. B62D 1/187
9,487,228 B2 * 11/2016 Fevre ..................... B62D 1/181
9,663,136 B2 * 5/2017 Stinebring ............. B62D 1/195
9,669,863 B2 * 6/2017 Ku ......................... B62D 1/195
9,849,904 B2 * 12/2017 Rouleau ................. B62D 1/183
10,189,496 B2 * 1/2019 King ...................... B62D 1/184
10,421,476 B2 * 9/2019 Rouleau ................. B62D 1/184
10,577,010 B2 * 3/2020 Derocher ............... B62D 1/183
10,604,172 B2 * 3/2020 Yoon ...................... B62D 1/187
10,633,013 B2 * 4/2020 Kreutz ................... B62D 5/001
10,640,139 B2 * 5/2020 Derocher ............... B62D 1/183
10,882,548 B2 * 1/2021 Freudenstein ......... B62D 1/181
10,933,902 B2 * 3/2021 Specht ................... B62D 1/181
10,967,898 B2 * 4/2021 Schmidt ................ F16C 29/123
10,974,757 B2 * 4/2021 Raich ..................... B62D 1/181
11,001,292 B2 * 5/2021 Derocher ............... B62D 1/195
11,034,376 B2 * 6/2021 Appleyard ............. B62D 1/183
11,345,387 B2 * 5/2022 Kurokawa ............. B62D 1/181
11,383,756 B2 * 7/2022 Ryne ...................... B62D 1/185
11,623,677 B2 * 4/2023 Kurokawa ............. B62D 1/181
74/493
11,697,449 B2 * 7/2023 Ryne ...................... B62D 1/187
74/484 R
11,745,787 B2 * 9/2023 Ryne ....................... F16H 53/06
74/493
11,753,063 B2 * 9/2023 Ku ......................... B62D 1/187
74/493
11,904,933 B2 * 2/2024 Ku ......................... B62D 1/192
11,919,564 B2 * 3/2024 Fevre ..................... B62D 1/181
11,919,565 B2 * 3/2024 Park ....................... B62D 1/185
2006/0266151 A1 * 11/2006 Avers ..................... B62D 1/181
74/492
2007/0029771 A1 * 2/2007 Haglund ................ B62D 1/181
280/775
2009/0064814 A1 * 3/2009 Tanaka ................... B62D 1/181
74/493
2015/0375768 A1 * 12/2015 Fevre ..................... B62D 1/181
74/493
2017/0029009 A1 * 2/2017 Rouleau ................. B62D 1/181
2018/0050720 A1 * 2/2018 King ...................... B62D 1/184
2019/0111960 A1 * 4/2019 Freudenstein ......... B62D 1/185
2019/0210632 A1 * 7/2019 Derocher ............... B62D 1/181
2019/0300042 A1 * 10/2019 Derocher ............... B62D 1/185
2021/0016820 A1 * 1/2021 Nozawa ................... B62D 1/04
2021/0129894 A1 * 5/2021 Ryne ...................... B60K 35/10
2021/0129896 A1 * 5/2021 Ryne ...................... B62D 1/187
2021/0229733 A1 * 7/2021 Kurokawa ............. B62D 1/184
2022/0402540 A1 * 12/2022 Fevre ..................... B62D 1/184

* cited by examiner

VEHICLE STEERING COLUMN

CROSS-REFERENCE TO RELATED APPLICATION

This application claims priority from Korean Patent Application No. 10-2023-0043916, filed on Apr. 4, 2023, which is hereby incorporated by reference for all purposes as if fully set forth herein.

BACKGROUND

Field

The present embodiments relate to a vehicle steering column and, more specifically, to a vehicle steering column that may more quickly and stably perform telescoping for adjusting the axial length of the steering column and stowing for drawing the steering wheel into or out of the dashboard, secure a convenient space for the driver, and provide safety and convenience to the driver.

Description of Related Art

In general, the steering column for a vehicle comes with telescoping and tilting features by which the driver may adjust the protrusion and tilt angle of the steering wheel to fit his height or body shape to enable smooth steering.

Recent steer-by-wire (SBW) steering devices achieve vehicle steering using an electric motor, instead of components for mechanically linking components, such as universal joint or pinion shaft, between the steering wheel and the wheels.

The development of steer-by-wire steering devices leads to the development of steering columns capable of self-driving that transports the driver to the destination even without the driver's manipulation of the acceleration pedal or brake. A demand arises for securing a spacious room for the driver's convenience during self-driving.

To that end, a research effort is being made to increase the telescoping-in or out distance of the steering shaft or increase the stowing distance for drawing the steering wheel into or out of the dashboard.

In the conventional vehicle steering column, however, an increase in drawing-in/out distance results in slowdown of telescoping and excessive loads on the motor, screw bar, and screw nut, which may deteriorate safety and convenience for the driver and components.

Accordingly, a need arises for research for a vehicle steering column capable of securing the driver's safety and convenience as well as stable and rapid operations even when the drawing-in/out distance of the vehicle steering column is increased.

BRIEF SUMMARY

Conceived in the foregoing background, the present embodiments relate to a vehicle steering column that may more quickly and stably perform telescoping for adjusting the axial length of the vehicle steering column and stowing for drawing the steering wheel into or out of the dashboard.

Further, the present embodiments relate to a vehicle steering column capable of securing a space while drawing in/out the vehicle steering column and the steering wheel, providing a convenient space for the driver by increasing the drawing-in/out length, and quickly and stably performing drawing-in/out operation to provide convenience to the driver.

According to the present embodiments, there may be provided a vehicle steering column comprising a mounting bracket fixed to a vehicle body, an upper moving member supported on the mounting bracket during stowing and axially drawn in or out, an intermediate member coupled to the upper moving member and having a lower moving member slidably coupled thereinside, the lower moving member coupled to a steering shaft, and a supporting member provided in the mounting bracket to support an outer circumferential surface of the upper moving member when the upper moving member axially moves.

According to the present embodiments, it is possible to more quickly and stably perform telescoping for adjusting the axial length of the vehicle steering column and stowing for drawing the steering wheel into or out of the dashboard.

According to the present embodiments, it is possible to secure a space while drawing in/out the vehicle steering column and the steering wheel, provide a convenient space for the driver by increasing the drawing-in/out length, and quickly and stably perform drawing-in/out operation to provide convenience to the driver.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
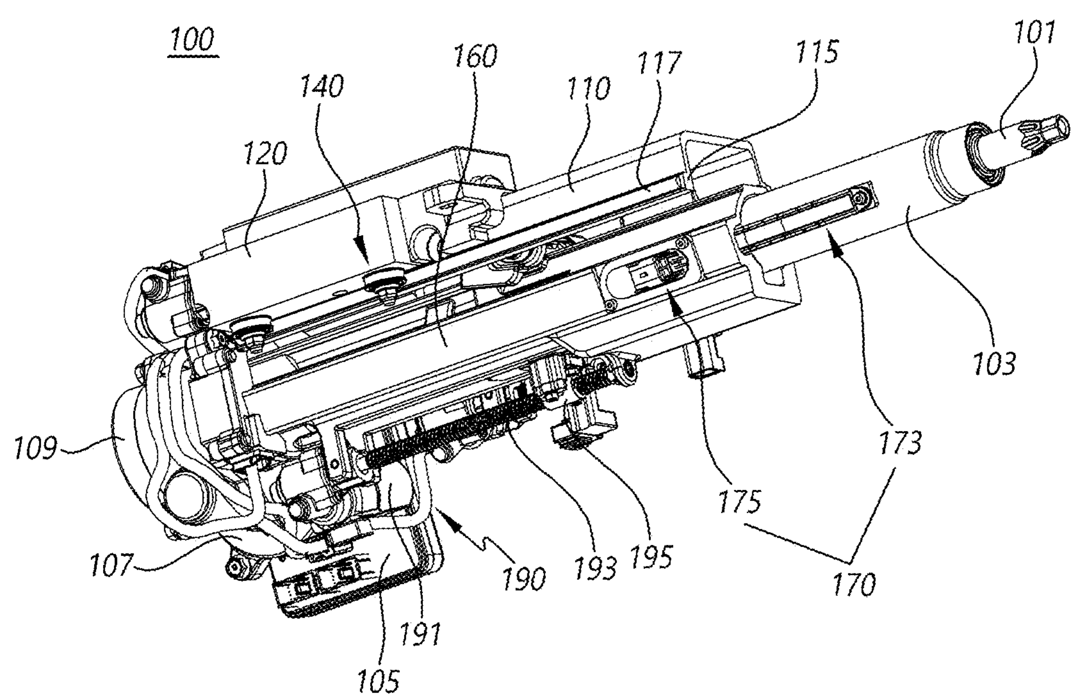
FIG. 1 is a perspective view illustrating a vehicle steering column according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
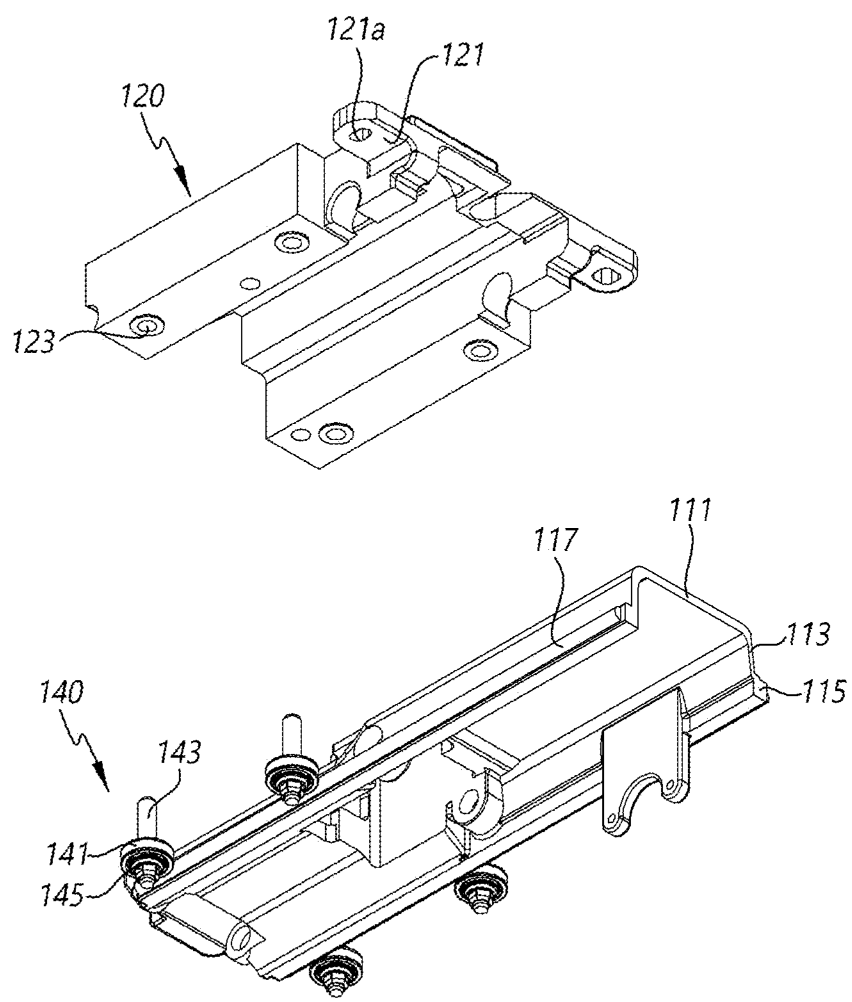
FIGS. 2, 3, and 4 are exploded perspective views illustrating a steering column for a vehicle according to the present embodiments.
Figure 3:
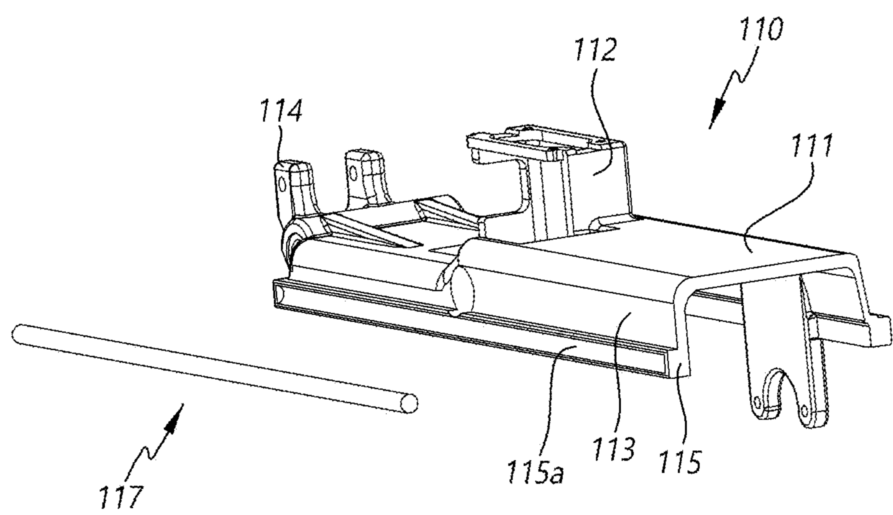
Figure 4:
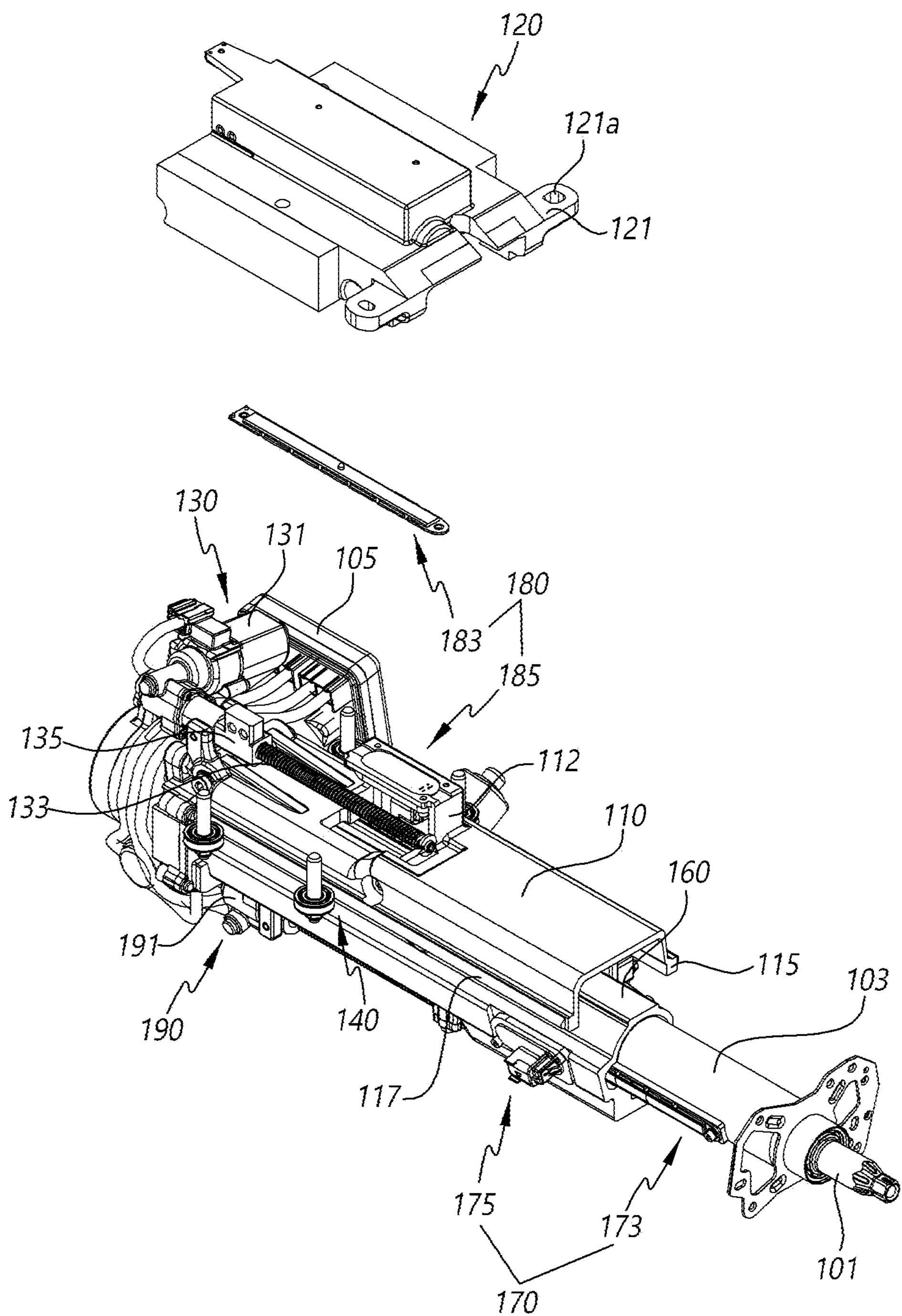
Figure 5:
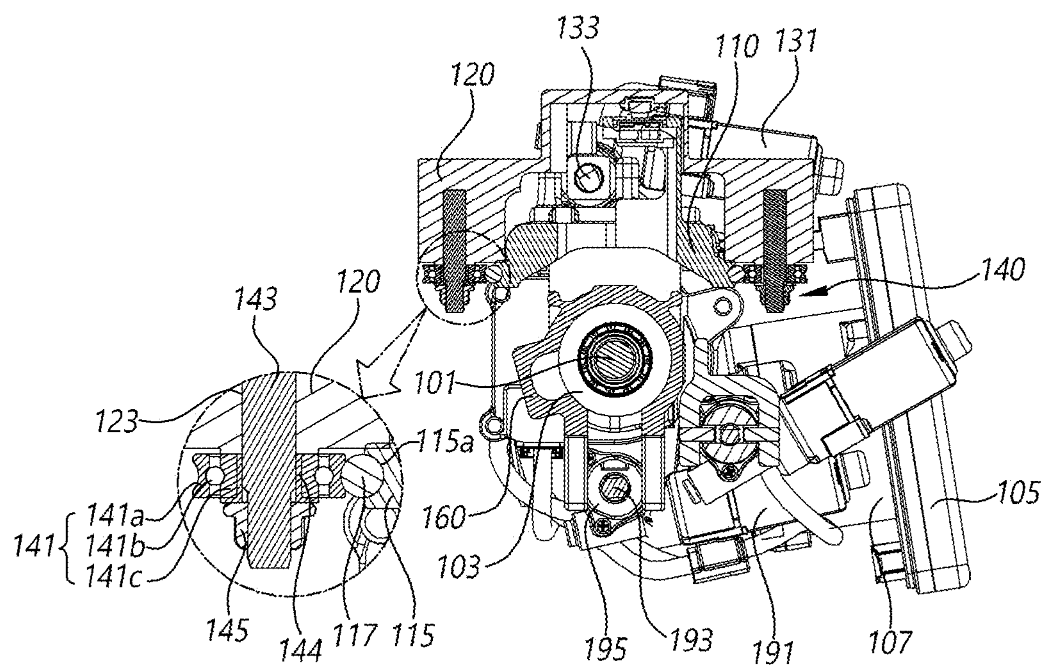
FIGS. 5, 6, 7, and 8 are cross-sectional views illustrating a steering column for a vehicle according to the present embodiments.

FIG. 1 is a perspective view illustrating a vehicle steering column according to the present embodiments. FIGS. 2, 3, and 4 are exploded perspective views illustrating a steering column for a vehicle according to the present embodiments. FIGS. 5, 6, 7, and 8 are cross-sectional views illustrating a steering column for a vehicle according to the present embodiments. FIG. 9 is a view illustrating a configuration of a steering column for a vehicle according to the present embodiments.

In the following embodiments and FIGS. 1 to 9, 'upper side' denotes a direction toward the steering wheel 101*a*, and 'lower side' denotes the opposite direction. 'Draw in' denotes moving the steering wheel 101*a* to the lower side to reduce the axial length of the steering column 100, and 'draw out' denotes moving the steering wheel 101*a* to the upper side to increase the axial length of the steering column 100.

A vehicle steering column 100 according to the present embodiments includes a mounting bracket 120 fixed to a vehicle body, an upper moving member 110 supported on the mounting bracket 120 during stowing and axially drawn in or out, an intermediate member 160 coupled to the upper moving member 110 and having a lower moving member 103 slidably coupled thereinside, the lower moving member coupled to a steering shaft 101, and a supporting member 140 provided in the mounting bracket 120 to support an outer circumferential surface of the upper moving member 110 when the upper moving member 110 axially moves.

The mounting bracket 120 has a fixing flange 121 and a fixing hole 121*a* for fixing to the vehicle body so that the steering column 100 is fixed to the vehicle body. The steering wheel 101*a* is coupled to an end of the steering shaft 101 so that the driver's steering is performed.

In the steering column 100 according to the present embodiments, an upper moving member 110 is slidably coupled to the mounting bracket 120 so that drawing-in/out motion is performed in the axial direction during stowing.

A lower moving member 103 which is formed as a hollow and allows the steering shaft 101 to be rotatably coupled thereinside is inserted into an intermediate member 160 which has a hollow shape so that drawing-in/out motion is performed in the axial direction during stowing.

In the present embodiments, the stowing motion that is drawing-in/out in the axial direction denotes drawing the steering wheel 101*a* into or out of the dashboard by adjusting the axial direction of the steering column 100 during autonomous driving mode and this includes telescoping that adjusts the length of the steering column 100 for the driver's convenience in general driver driving mode. The following description focuses primarily on stowing.

The upper moving member 110 is supported on the mounting bracket 120 by an upper actuator 130 and performs stowing that is drawing-in/out in the axial direction, and the lower moving member 130 is supported on the intermediate member 160 by a lower actuator 190 and performs stowing that is drawing-in/out in the axial direction.

The upper actuator 130 includes an upper motor 131 for generating a driving force with electrical energy, an upper screw bar 133 rotated by the upper motor 131, and an upper screw nut 135 coupled to the upper screw bar 133.

The upper motor 131 controlled by an electronic control unit 105 rotates the upper screw bar 133. Thus, the upper screw nut 135 coupled to the upper moving member 110 is axially moved, so that the drawing-in/out of the upper moving member 110 is performed.

The lower actuator 190 includes a lower motor 191 for generating a driving force with electrical energy, a lower screw bar 193 rotated by the lower motor 191, and a lower screw nut 195 coupled to the lower screw bar 193.

The lower motor 191 controlled by the electronic control unit 105 rotates the lower screw bar 193. Thus, the lower screw nut 195 coupled to the lower moving member 103 is axially moved, so that the drawing-in/out of the lower moving member 103 is performed.

The mounting bracket 120 has a supporting member 140 so that the supporting member 140 may support the outer circumferential surface of the upper moving member 110 when the upper moving member 110 moves in the axial direction.

As stowing is performed while the supporting member 140 supports the outer circumferential surface of the upper moving member 110, it is possible to prevent vibration and noise that are generated due to a gap which is caused from a manufacturing or assembly error of the mounting bracket 120 and the upper moving member 110 while drawing in/out the upper moving member 110.

The upper moving member 110 includes an upper plate 111 having a sensor mounting portion 112 and side plates 113 bent from two opposite sides of the upper plate 111.

Protruding end portions 115 protrude outward on two opposite sides of the end of the side plate 113 to support stowing of the upper moving member 110. A guide rail 117 is provided on the protruding end portion 115 to be supported by the supporting member 140. A tilt coupling portion 114 rotatably coupled to the mounting bracket 120 to implement tilting is provided at one end of the upper moving member 110.

Accordingly, when the upper moving member 110 is stowed in or out, the guide rail 117 is supported by the supporting member 140, stowing the upper moving member 110.

The guide rail 117 is formed in a bar shape having a convex outer circumferential surface and is disposed on the protruding end portion 115 of the upper moving member 110.

The protruding end portion 115 of the upper moving member 110 has a fixing recess 115*a* where the guide rail 117 is coupled and fixed, firmly supporting the guide rail 117 in place when the upper moving member 110 is stowed in and out.

In the present embodiments, an example in which the guide rail 117 is coupled to the fixing recess 115*a* is illustrated, but the present embodiments are not limited thereto. For example, the guide rail 117 may be integrally formed with the outer surface of the protruding end portion 115.

The supporting member 140 may include a rotating supporting member 141 supported and rotated on the guide rail 117, a supporting shaft 143 rotatably coupled to a center hole of the rotating supporting member 141 and coupled to the mounting bracket 120, and a shaft coupling member 145 supporting the rotating supporting member 141 on the mounting bracket 120 and coupled to the supporting shaft 143.

The mounting bracket 120 has a supporting hole 123 to which the supporting shaft 143 is coupled, so that the supporting shaft 143 is screwed to the supporting hole 123 while rotatingly supporting the rotating supporting member 141, and the shaft coupling member 145 is screwed and fixed to an end of the supporting shaft 143.

The rotating supporting member 141 may include an annular outer member 141*a* supported on the guide rail 117, an annular inner member 141*c* coupled to the supporting shaft 143, and a ball member 141*b* coupled between the outer member 141*a* and the inner member 141*c* to roll.

As the outer member 141*a* and the inner member 141*c* are disposed outside and inside via the ball member 141*b* and are integrally coupled together, the guide rail 117 is drawn in/out while being supported on the outer member 141*a* when the upper moving member 110 is stowed and, at this time, the ball member 141*b* is rolled, rotating the outer member 141*a*.

The inner member 141*c* is coupled to the supporting shaft 143, supporting the rolling of the ball member 141*b* and rotation of the outer member 141*a*.

The supporting member 140 may further include an elastic supporting member 144 that is elastically compressed and coupled between the inner member 141*c* and the supporting shaft 143 to support the inner member 141*c*.

The elastic supporting member 144 has a head portion supported on the shaft coupling member 145 and is formed in an annular shape inserted into the supporting shaft 143, minimizing the gap between the inner member 141*c* and the supporting shaft 143 and thereby preventing vibration and noise when the upper moving member 110 is stowed.

Figure 6:
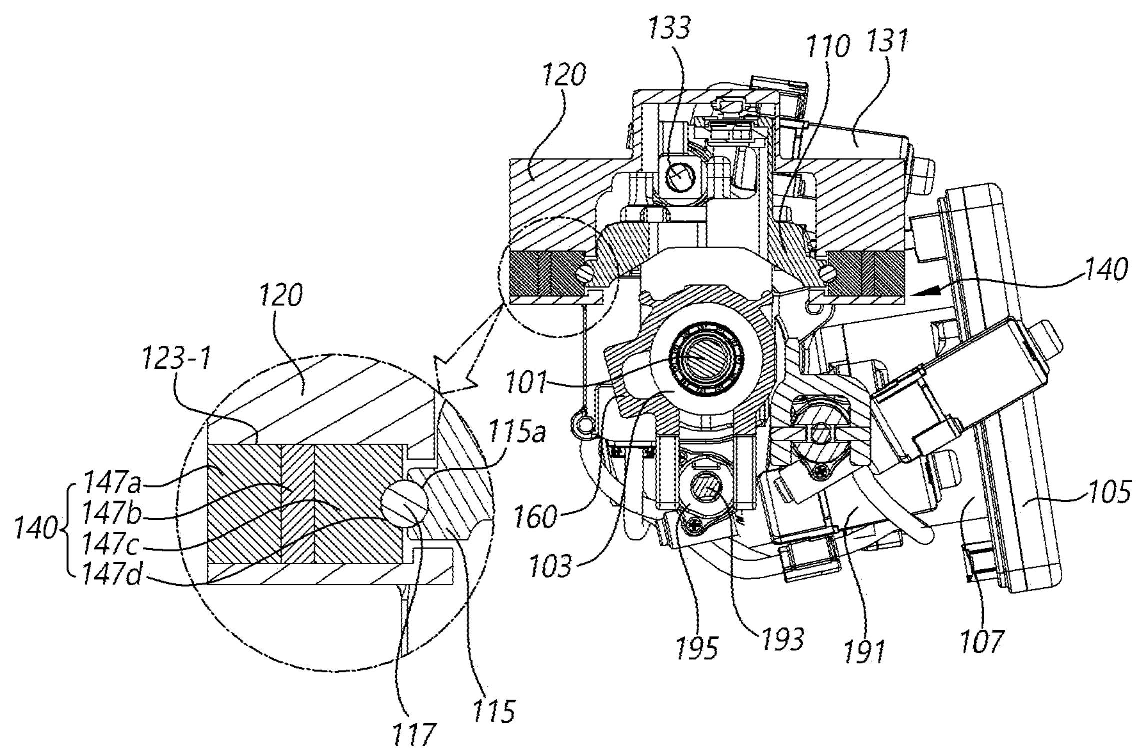

Further, as shown in FIG. 6, side fastening holes 123-1 may be provided in two opposite surfaces of the mounting bracket 120 to be formed through toward the upper moving member 110, allowing a supporting member 147 to be coupled thereto.

In this case, the supporting member 147 may include an insertion member 147*c* inserted into the side fastening hole 123-1 to allow a side end thereof to support the outer circumferential surface of the guide rail 117 and a coupling member 147*a* supporting the insertion member 147*c* toward the guide rail 117 and coupled to the side fastening hole 123-1.

A rail supporting recess 147*d* concavely recessed at a position facing the outer circumferential surface of the guide rail 117 may be provided in a side end of the insertion member 147*c*, so that the guide rail 117 may be slid while being supported in the rail supporting recess 147*d* when the upper moving member 110 is stowed.

The rail supporting recess 147*d* provided in one side end of the insertion member 147*c* is formed as a concave curved surface on the inner surface of the insertion member 147*c*, so that the guide rail 117 is seated and supported in the rail supporting recess 147*d*.

Further, the supporting member 147 may further include an elastic member 147*b* that is formed in a plate shape coupled between the insertion member 147*c* and the coupling member 147*a* and applies elastic force to two opposite sides.

Here, the elastic member 147*b* may be formed of at least one of elastic materials, such as natural rubber (NR), butadiene rubber (BR), nitrile butadiene rubber (NBR), chloroprene rubber (CR), ethylene propylene diene monomer rubber (EPDM), styrene butadiene rubber (SBR), chlorosulphonated polyethylene (CSM), fluorine rubber, silicone, urethane, or thermoplastic polyurethane (TPU), to be able to absorb shock and noise while minimizing the gap between the insertion member 147*c* and the coupling member 147*a* or may be formed of at least one of plastic materials, such as polyacetal (POM), polyamide (PA), polycarbonate (PC), polyimide (PI), polybutylene terephthalate (PBT), polyethylene terephthalate (PET), or the like.

Figure 7:
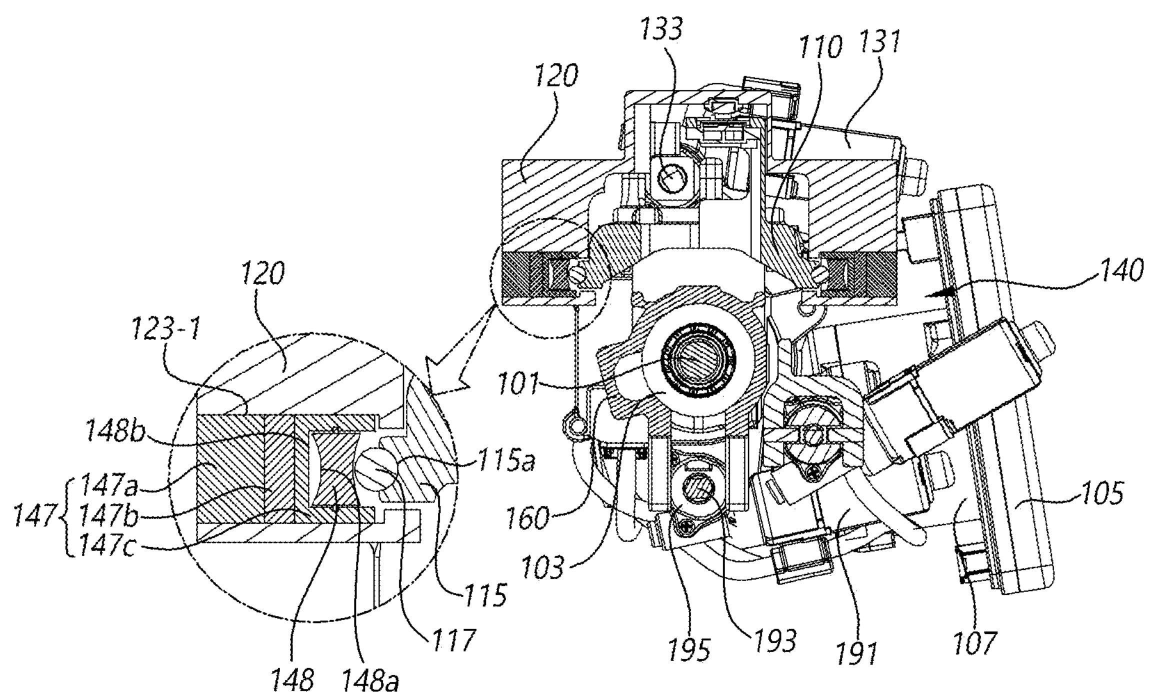

Further, as shown in FIG. 7, a roller 148 that rotatingly supports the outer circumferential surface of the guide rail 117 may be provided on one side end of the insertion member 147*c*.

The roller 148 has a rotational shaft coupled to the inner recess 148*b* of the insertion member 147*c* to be rotatingly supported, and a concave seating recess 148*a* is provided in the outer circumferential surface of the roller 148 to support the outer circumferential surface of the guide rail 117.

Figure 8:
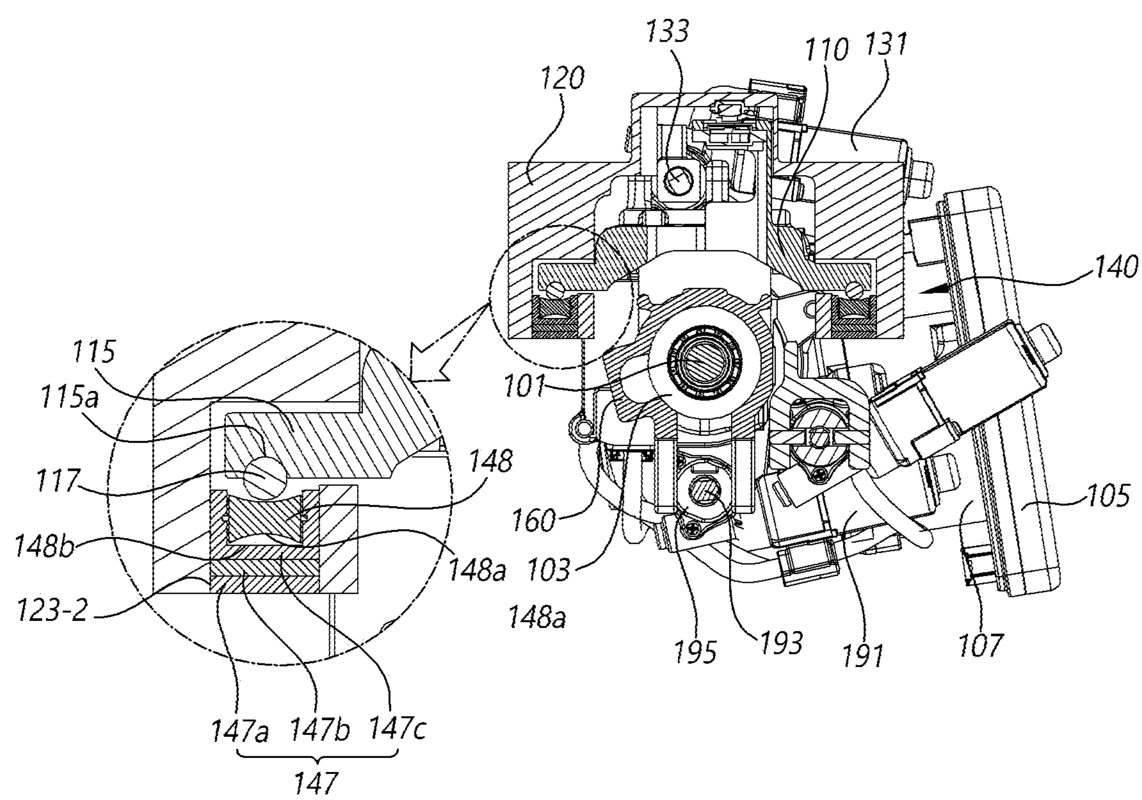
Figure 9:
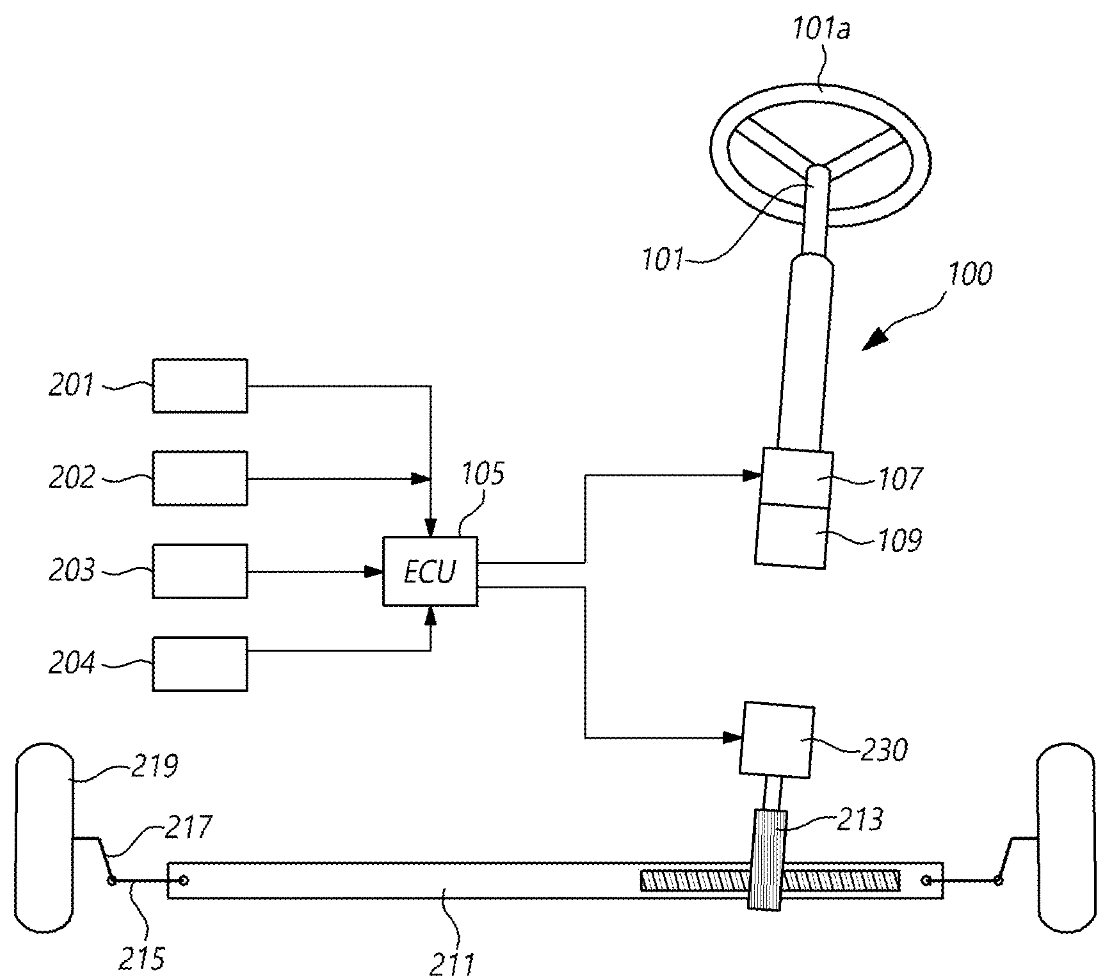
FIG. 9 is a view illustrating a configuration of a steering column for a vehicle according to the present embodiments.

Further, as shown in FIG. 8, a lower surface fastening hole 123-2 may be provided in a lower surface of the mounting bracket 120 to be formed through toward the upper moving member 110, allowing a supporting member 147 to be coupled thereto.

In this case, the supporting member 147 may include an insertion member 147*c* inserted into the lower surface fastening hole 123-2 to allow a side end thereof to support the outer circumferential surface of the guide rail 117 and a coupling member 147*a* supporting the insertion member 147*c* toward the guide rail 117 and coupled to the lower surface fastening hole 123-2.

Further, the supporting member 147 may further include an elastic member 147*b* that is coupled between the insertion member 147*c* and the coupling member to apply elastic force to two opposite sides.

Here, the elastic member 147*b* may be formed of at least one of the above-described elastic materials to absorb shocks and noise while minimizing the gap between the insertion member 147*c* and the coupling member or may be formed of at least one of the above-described plastic materials.

A roller 148 may be provided on one side end of the insertion member 147*c* to rotatingly support the outer circumferential surface of the guide rail 117, and a concave supporting recess 148*a* may be provided in the outer circumferential surface of the roller 148 to support the outer circumferential surface of the guide rail 117.

In the present embodiments, an upper position sensor 180 and a lower position sensor 170 may be further included to detect accurate position information during stowing of the upper moving member 110 and the lower moving member 103.

The upper position sensor 180 may include an upper magnet 183 coupled and fixed to an inner surface of the mounting bracket 120 and an upper sensor 185 provided on a sensor mounting portion 112 of the upper moving member 110 to detect a change in the magnetic field of the upper magnet 183.

The lower position sensor 170 may include a lower magnet 173 coupled to the outer circumferential surface of the lower moving member 103 and a lower sensor 175 provided on the intermediate member 160 to detect a change in the magnetic field of the lower magnet 173 when the lower moving member 103 axially moves.

Therefore, during stowing, the upper position sensor 180 detects the axial position of the upper moving member 110 with respect to the mounting bracket 120 and transmits it to the electronic control unit 105, and the lower position sensor 170 detects the axial position of the lower moving member 103 with respect to the intermediate member 160 and transmits it to the electronic control unit 1015.

Thus, during stowing, it is possible to detect precise position information about the upper moving member 110 and the lower moving member 103 and transmit the information to the electronic control unit 105.

The vehicle steering column 100 according to the present embodiments may be applied to a vehicle steering column 100 that is capable of self-driving, as well as a vehicle steering column 100 that is steered by the driver.

Referring to FIG. 9 which illustrates a steer-by-wire steering device capable of self-driving, when the driver manipulates the steering wheel 101*a*, an angle sensor 201 and a torque sensor 202 are operated to detect the driver's manipulation and send an electrical signal to the electronic control unit 105 to thereby operate the steering wheel motor 107 and the pinion shaft motor 230.

The electronic control unit 105 controls the steering wheel motor 107 and the pinion shaft motor 230 based on the electrical signals transmitted from the angle sensor 201 and the torque sensor 202 and electrical signals transmitted from other various sensors mounted to the vehicle.

The steering wheel motor 107 is connected to a reducer (not shown) for reducing the number of rotations of the motor. In normal driving, the steering wheel motor 107 provides a reaction force to the steering wheel 101*a* so that the driver may feel the steering reaction force in the opposite direction when manipulating the steering wheel 101*a*. In autonomous driving, steering is performed under the control of the electronic control unit 105 without the driver's involvement.

The pinion shaft motor 230 may slide the rack bar 211 connected to the pinion shaft 213 to steer the wheels 219 on two opposite sides through the tie rods 215 and the knuckle arms 217.

Although FIG. 9 illustrates an example in which an angle sensor 201, a torque sensor 202, a vehicle velocity sensor 203 for transmitting steering information to the electronic control unit 105, and a wheel rotational angle sensor 204 are provided for convenience of description, a motor position sensor, various radars or lidars, or image sensors, such as cameras, may further be provided, which are not described in detail.

In such a steer-by-wire steering device, since the steering wheel 101*a* and the wheel 219 are not mechanically connected to each other, a mechanical limitation is required to stop the rotation of the steering wheel 101*a* at a predetermined angle when the steering wheel 101*a* is operated by the driver.

Accordingly, a rotational angle limiting member 109 may be provided to mechanically limit the rotational angle of the steering wheel 101*a* to stop the steering wheel 101*a* from further rotation when the rotation of the wheel 119 reaches the maximum point (when the steering wheel 101*a* or the wheel 119 is in a full-turn state in the general steering device).

According to the present embodiments, it is possible to more quickly and stably perform telescoping for adjusting the axial length of the vehicle steering column and stowing for drawing the steering wheel into or out of the dashboard.

According to the present embodiments, it is possible to secure a space while drawing in/out the vehicle steering column and the steering wheel, provide a convenient space for the driver by increasing the drawing-in/out length, and quickly and stably perform drawing-in/out operation to provide convenience to the driver.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering column, comprising:

a mounting bracket fixed to a vehicle body;

an upper moving member supported on the mounting bracket during stowing and axially drawn in or out;

an intermediate member coupled to the upper moving member and having a lower moving member slidably coupled thereinside, the lower moving member coupled to a steering shaft; and a supporting member provided in the mounting bracket to support guide rails provided on an outer circumferential surface of the upper moving member when the upper moving member axially moves, wherein side fastening holes are formed through toward the guide rails in two opposite surfaces of the mounting bracket to allow the supporting member to be coupled thereto and support the mounting bracket to the guide rails, wherein the supporting member includes:

an insertion member inserted into the side fastening hole to allow a side end thereof to support an outer circumferential surface of the guide rail toward the upper moving member; and a coupling member supporting the insertion member toward the guide rail and coupled to the side fastening hole, wherein a rail supporting recess is provided in the side end of the insertion member, at a position facing the outer circumferential surface of the guide rail.

2. The vehicle steering column of claim 1, wherein protruding end portions protrude outward on two opposite surfaces of the upper moving member to be supported by the supporting member.

3. The vehicle steering column of claim 2, wherein the protruding end portion has the guide rail supported by the supporting member.

4. The vehicle steering column of claim 3, wherein the guide rail has a curved bar shape with a convex outer circumferential surface.

5. The vehicle steering column of claim 4, wherein the protruding end portion has a fixing recess to which the guide rail is coupled and fixed.

6. The vehicle steering column of claim 1, wherein the rail supporting recess is formed as a concave curved surface where an outer surface of the guide rail is seated and supported.

7. A vehicle steering column, comprising:

a mounting bracket fixed to a vehicle body;

an upper moving member supported on the mounting bracket during stowing and axially drawn in or out;

an intermediate member coupled to the upper moving member and having a lower moving member slidably coupled thereinside, the lower moving member coupled to a steering shaft; and a supporting member provided in the mounting bracket to support guide rails provided on an outer circumferential surface of the upper moving member when the upper moving member axially moves, wherein side fastening holes are formed through toward the guide rails in two opposite surfaces of the mounting bracket to allow the supporting member to be coupled thereto and support the mounting bracket to the guide rails, wherein the supporting member includes:

an insertion member inserted into the side fastening hole to allow a side end thereof to support an outer circumferential surface of the guide rail toward the upper moving member; and a coupling member supporting the insertion member toward the guide rail and coupled to the side fastening hole, wherein the supporting member further includes an elastic member coupled between the insertion member and the coupling member to apply an elastic force to two opposite sides.

8. A vehicle steering column, comprising:

a mounting bracket fixed to a vehicle body;

an upper moving member supported on the mounting bracket during stowing and axially drawn in or out;

an intermediate member coupled to the upper moving member and having a lower moving member slidably coupled thereinside, the lower moving member coupled to a steering shaft; and a supporting member provided in the mounting bracket to support guide rails provided on an outer circumferential surface of the upper moving member when the upper moving member axially moves, wherein side fastening holes are formed through toward the guide rails in two opposite surfaces of the mounting bracket to allow the supporting member to be coupled thereto and support the mounting bracket to the guide rails, wherein the supporting member includes:

an insertion member inserted into the side fastening hole to allow a side end thereof to support an outer circumferential surface of the guide rail toward the upper moving member; and a coupling member supporting the insertion member toward the guide rail and coupled to the side fastening hole, wherein a roller is provided on the side end of the insertion member to rotatingly support the outer circumferential surface of the guide rail.

9. The vehicle steering column of claim 8, wherein a concave seating recess is provided in an outer circumferential surface of the roller to support the outer circumferential surface of the guide rail.

* * * * *